US012704426B2

(12) United States Patent
Patterson et al.

(10) Patent No.: US 12,704,426 B2
(45) Date of Patent: Aug. 11, 2026

(54) SAFETY DEVICE FOR FLUID ENDS

(71) Applicant: FORUM US, INC., Houston, TX (US)

(72) Inventors: Stephen Patterson, Westhill (GB); Sohaib Anwer, Houston, TX (US); Francis Santos, San Antonio, TX (US); Blake E. Smith, College Station, TX (US); Paul Nguyen, Cypress, TX (US)

(73) Assignee: FORUM US, INC., Houston, TX (US)

( * ) Notice: Subject to any disclaimer, the term of this patent is extended or adjusted under 35 U.S.C. 154(b) by 279 days.

(21) Appl. No.: 18/510,377

(22) Filed: Nov. 15, 2023

(65) Prior Publication Data

US 2025/0155304 A1 May 15, 2025

(51) Int. Cl.
*G01L 7/16* (2006.01)
*F04B 49/02* (2006.01)
*F04B 49/08* (2006.01)
*G08B 5/06* (2006.01)

(52) U.S. Cl.
CPC ............ *G01L 7/166* (2013.01); *F04B 49/022* (2013.01); *F04B 49/08* (2013.01); *G08B 5/06* (2013.01)

(58) Field of Classification Search
CPC ........... G01L 7/166; G01L 7/163; G08B 5/06; G08B 5/18; F04B 49/022; F04B 49/08
See application file for complete search history.

(56) References Cited

U.S. PATENT DOCUMENTS 1,631,714 A 6/1927 Wellman
3,181,496 A 5/1965 Bilbrey
3,914,752 A 10/1975 Howard et al.
5,846,056 A * 12/1998 Dhindsa ................ F04B 49/065 73/152.52
8,998,593 B2 4/2015 Vicars
9,188,121 B1 11/2015 Dille
9,677,391 B2 6/2017 Banks et al.
9,759,339 B2 9/2017 Krywitsky
11,149,855 B2 10/2021 Guerra et al.
2006/0231013 A1 10/2006 Lane et al.
2014/0109823 A1 4/2014 Leavitt
2014/0322050 A1 10/2014 Marette et al.
2019/0072089 A1 3/2019 Buckley
2020/0182240 A1 6/2020 Nowell et al.
2020/0225132 A1 7/2020 Harshbarger et al.
2023/0167728 A1 6/2023 Marette

OTHER PUBLICATIONS

Valmet, "Hydraulic safety, general practice reminders and trouble-shooting" Mar. 8, 2016, https://www.valmet.com/insights/articles/up-and-running/reliability/RTFluidTrouble/. (Year: 2016).*
PCT International Search Report and Written Opinion dated Dec. 12, 2024, for International Application No. PCT/US2024/051357.

* cited by examiner

*Primary Examiner* — Paul M. West

(74) *Attorney, Agent, or Firm* — Patterson + Sheridan, LLP

(57) ABSTRACT

A safety device coupled to a fluid end such that the safety device is in fluid communication with at least one of a suction chamber and a discharge chamber of the fluid end. The safety device has an outer housing and a visual indicator. The visual indicator is moveable between a first position where the visual indicator is retracted into the outer housing, and a second position where the visual indicator is extended out of the outer housing.

22 Claims, 6 Drawing Sheets

SAFETY DEVICE FOR FLUID ENDS

BACKGROUND

Field

The present disclosure relates to safety devices, such as a pressure indicator, for fluid ends.

Description of the Related Art

Fluid ends of frac pumps or mud pumps are used in the oil and gas industry to conduct wellbore fracturing operations. The fluid ends, and specifically, the internal components within the fluid ends, are subjected to extremely high pressure fluid flow during operation and require periodic maintenance and/or repair. Unfortunately, workers conducting maintenance and/or repair have removed access covers of the fluid ends unknowingly while the fluid end is still under pressure, resulting in injury to the workers.

Therefore, there is a need for safety devices for fluid ends.

SUMMARY

Implementations of the present disclosure relate to safety devices for fluid ends.

In one embodiment, a fluid end comprises a fluid end body having a suction chamber and a discharge chamber formed within the fluid end body; a suction valve assembly configured to control fluid flow into the suction chamber; a discharge valve assembly configured to control fluid flow into the discharge chamber; and a safety device coupled to the fluid end body and in fluid communication with at least one of the suction chamber and the discharge chamber, wherein the safety device comprises an outer housing and a visual indicator, and wherein the visual indicator is moveable between a first position where the visual indicator is retracted into the outer housing, and a second position where the visual indicator is extended out of the outer housing.

In one embodiment, a safety method comprises shutting down a fluid end by stopping pressurized fluid flow through the fluid end and draining pressurized fluid from the fluid end; when the fluid end is not operating, viewing a safety device that is coupled to the fluid end to determine whether there is still pressurized fluid within the fluid end at a pressure above a predetermined pressure, wherein the safety device comprises an outer housing and a visual indicator at least partially disposed within the outer housing that is movable between a first position to a second position; if the visual indicator is viewed as being in the first position such that the visual indicator is retracted into the outer housing, then further comprising accessing internal components of the fluid end by removing a cover of the fluid end; and if the visual indicator is viewed as being in the second position such that the visual indicator is extended out of the outer housing, then further comprising draining the pressurized fluid again from the fluid end until the safety device is viewed as being in the first position.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Implementations of the present disclosure relate to safety devices, such as a pressure indicator, for fluid ends. In one or more embodiments, a safety device is coupled to the fluid end and provides and indication when the fluid end is pressurized.

The present disclosure contemplates that use of terms such as "coupled," "couple(s)", and/or "coupling," can include direct coupling and/or indirect coupling, such as coupling through other components. The present disclosure also contemplates that use of terms such as "coupled," "couple(s)", and/or "coupling," can include but are not limited to connecting, welding, interference fitting, brazing, and/or fastening using fasteners, such as pins, rivets, screws, bolts, and/or nuts. The present disclosure also contemplates that use of terms such as "coupled," "couple(s)", and/or "coupling," can include but are not limited to components being integrally formed together as a unitary body. The present disclosure also contemplates that the use of terms such as "coupled," "couple(s)", and/or "coupling," can include operable coupling such as mechanical coupling, electrical coupling, and/or hydraulic (e.g. fluidly) coupling.

Embodiments of the fluid end designs described herein can be used with oilfield frac pumps, in addition to other industries that use positive displacement pumping systems with fluid ends for any and all types of fluid flow pumping.

Figure 1:
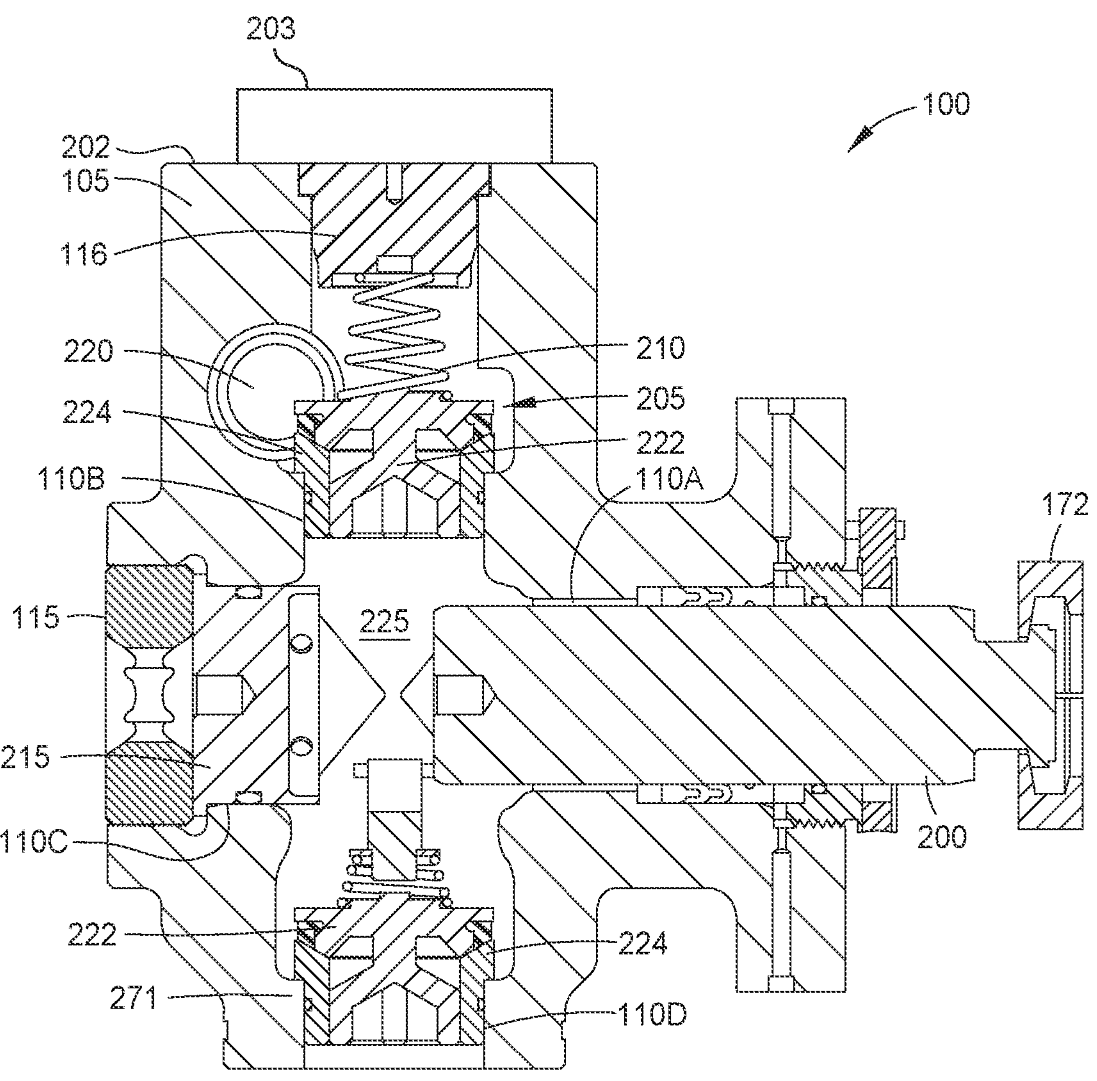
FIG. 1 is a sectional view of a fluid end, according to one or more embodiments.

FIG. 1 is a cross-sectional view of a fluid end 100 having a fluid end body 105, according to one implementation. The fluid end 100 includes a plurality of bores 110A-110D formed in the sides of the fluid end body 105. A plunger 200 with a plunger clamp 172 (for connection to a power end rod) is shown disposed in the bore 110A. A top cover 203 is disposed on top of a valve cover 116, which is disposed at least partially in the bore 110B. Although the top cover 203 and the valve cover 115 are shown as two separate components, the top cover 204 and the valve cover 115 can be integrally formed as a single piece forming a top end cover.

A discharge valve assembly 205 having a valve body 222, a valve seat 224, and a spring 210 is also disposed in the bore 110B. A discharge manifold 220 formed within the fluid end body 105 is in selective communication with at least the bore 110B via the discharge valve assembly 205. A discharge chamber 230 is formed within bore 110B above the discharge valve assembly 205. A suction valve assembly 271 having a valve body 222, a valve seat 224, and a spring 210 is disposed in the bore 110D, which is in fluid communication with a suction manifold. A retainer nut 115 and a suction cover 215 is disposed in the bore 110C.

The bores 110A-110D formed in the fluid end body 105 intersect within the fluid end body 105 forming a suction chamber 225. The plunger 200 reciprocates back and forth, causing fluid flow into the suction chamber 225 via the suction manifold and the suction valve assembly 271, and causing fluid flow out of the suction chamber 225 via the discharge valve assembly 205 into the discharge chamber 230. The fluid in the discharge chamber 230 flows directly into the discharge manifold 220 and out of the fluid end 100.

When maintenance and/or repair is required, a worker can remove the top cover 203 and the valve cover 116 to access the internal components of the fluid end 100. However, unknowingly to the worker, there can still be pressurized fluid in the discharge chamber 230 when removing the top cover 203 and the valve cover 116. The pressurized fluid can cause the top cover 203, the valve cover 116, and/or any other internal component to blow out of the fluid end 100, like a projectile, which can cause severe injury to the worker. The pressurized fluid itself can similarly cause injury to the worker.

Figure 2:
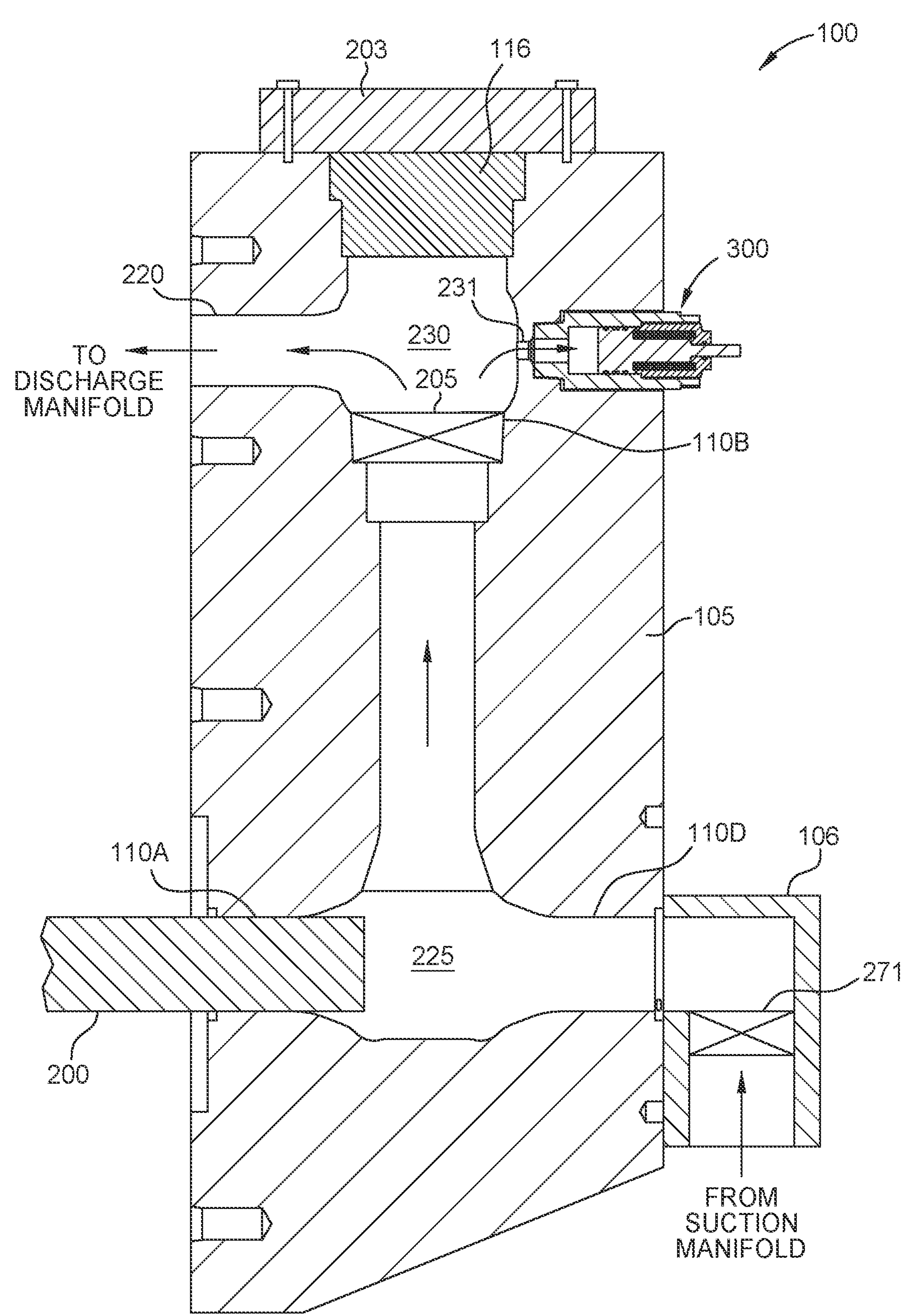
FIG. 2 is a sectional view of a fluid end having a safety device, according to one or more embodiments.

FIG. 2 is a sectional view of another variation of the fluid end 100 having a safety device 300. The components of the fluid end 100 shown in FIG. 2 which are similar as the components of the fluid end 100 shown in FIG. 1 are labeled with the same reference numbers. The suction valve assembly 271 is shown disposed in a suction valve body 106 that is coupled to and in fluid communication with the fluid end body 105 via bore 110D.

The safety device 300 is coupled to the fluid end body 105 and is configured to provide an indication whether there is pressurized fluid within the discharge chamber 230. Although described herein as being in fluid communication with the discharge chamber 230, the same or additional safety devices 300 can alternatively or in addition to be coupled to the fluid end body 105 and configured to provide an indication whether there is pressurized fluid within the suction chamber 225. The safety device 300 can be viewed by a worker to ensure that there is no pressurized fluid within at least the discharge chamber 230 such that it is safe to access the internal components of the fluid end 100.

The safety device 300 is coupled to the fluid end body 105 such that the safety device 300 is in fluid communication with the discharge chamber 230. Pressurized fluid in the discharge chamber 230 can flow through a port 231 into the safety device 300. The pressurized fluid can move the safety device from a first position to a second position as detailed below.

When there is no pressurized fluid or when the pressurized fluid within the discharge chamber 230 is below a predetermined pressure, the safety device 300 remains in the first position. When in the first position, the safety device 300 provides a visual indication that there is no pressurized fluid or that the pressurized fluid within the discharge chamber 230 is below the predetermined pressure. When there is no pressurized fluid or when the pressurized fluid within the discharge chamber 230 is below a predetermined pressure, a worker can safely access the internal components of the fluid end 100, such as by removing the top cover 203 and/or the valve cover 116.

When the pressurized fluid within the discharge chamber 230 is at or above the predetermined pressure, the pressurized fluid moves the safety device 300 from the first position to the second position. When in the second position, the safety device 300 provides a visual indication that the pressurized fluid within the discharge chamber 230 is at or above the predetermined pressure. When the pressurized fluid within the discharge chamber 230 is at or above the predetermined pressure, a worker should not access the internal components of the fluid end 100, such as by removing the top cover 203 and/or the valve cover 116.

Figure 3:
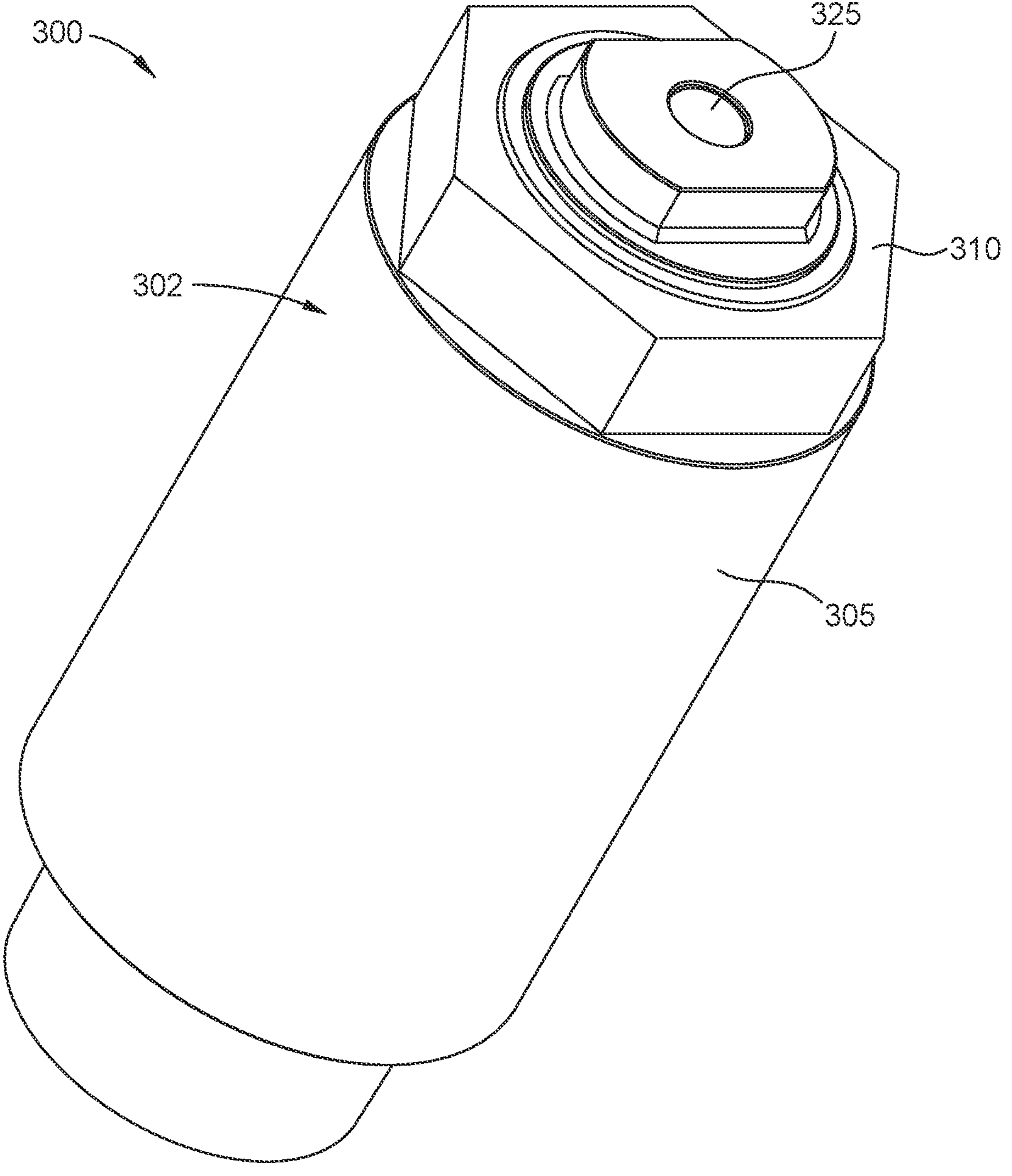
FIG. 3 is a view of the safety device in a first position, according to one or more embodiments.

FIG. 3 illustrates the safety device 300 when in the first position. The safety device 300 includes a top housing 310 coupled to a bottom housing 305, collectively forming an outer housing 302. The safety device 300 further includes a visual indicator 325 that is extended out of and retracted into the outer housing 302. When the safety device 300 is in the first position, the visual indicator 325 is retracted into the outer housing 302. A worker can visually see that the visual indicator 325 is in the retracted position, which means that the safety device 300 is in the first position and therefore it is safe to access the internal components of the fluid end 100.

Figure 4:
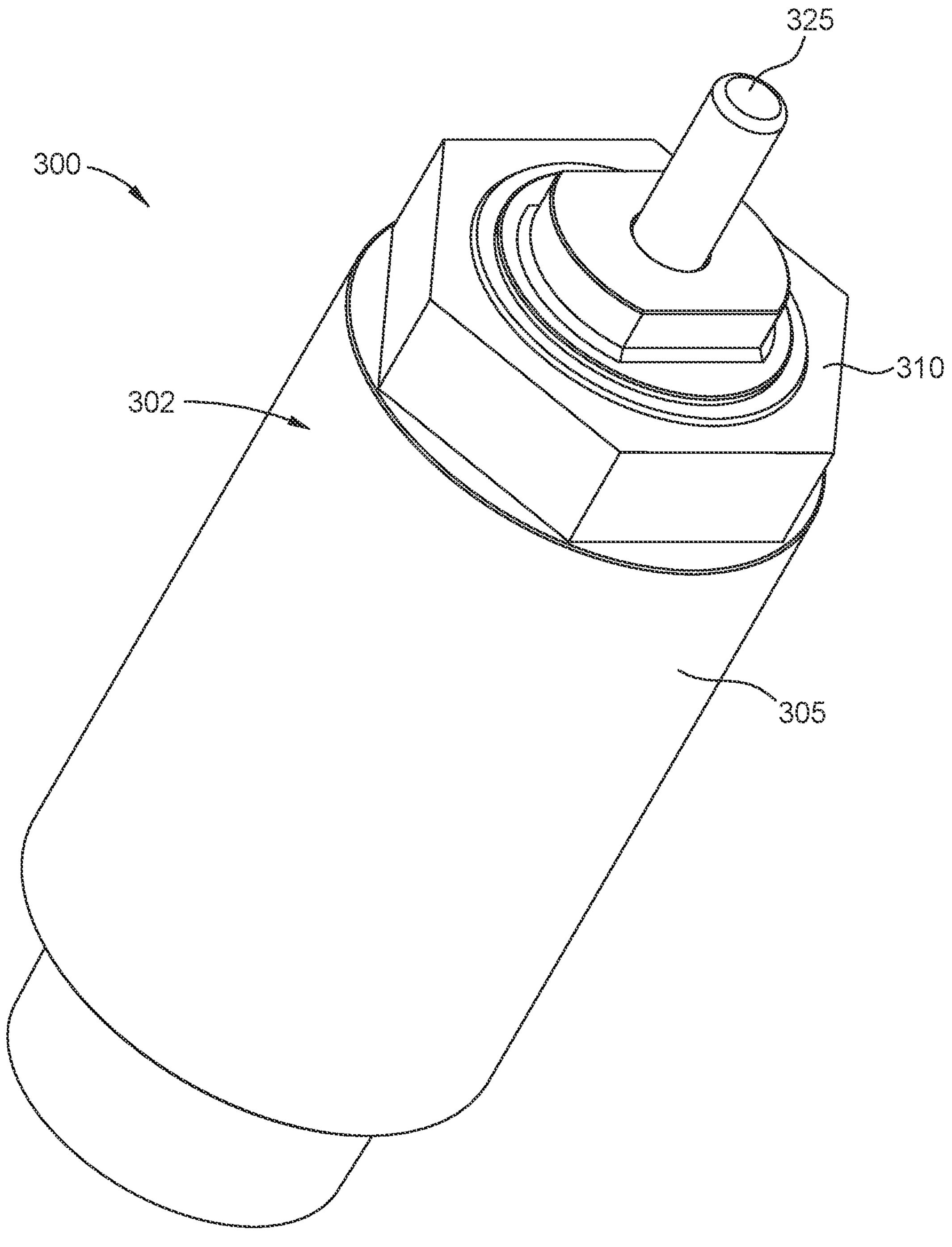
FIG. 4 is a view of the safety device in a second position, according to one or more embodiments.

FIG. 4 illustrates the safety device 300 when in the second position. When the safety device 300 is in the second position, the visual indicator 325 is extended out of the outer housing 302. A worker can visually see that the visual indicator 325 is in the extended position, which means that the safety device 300 is in the second position and therefore it is not safe to access the internal components of the fluid end 100 due to pressurized fluid within the fluid end 100.

Figure 5:
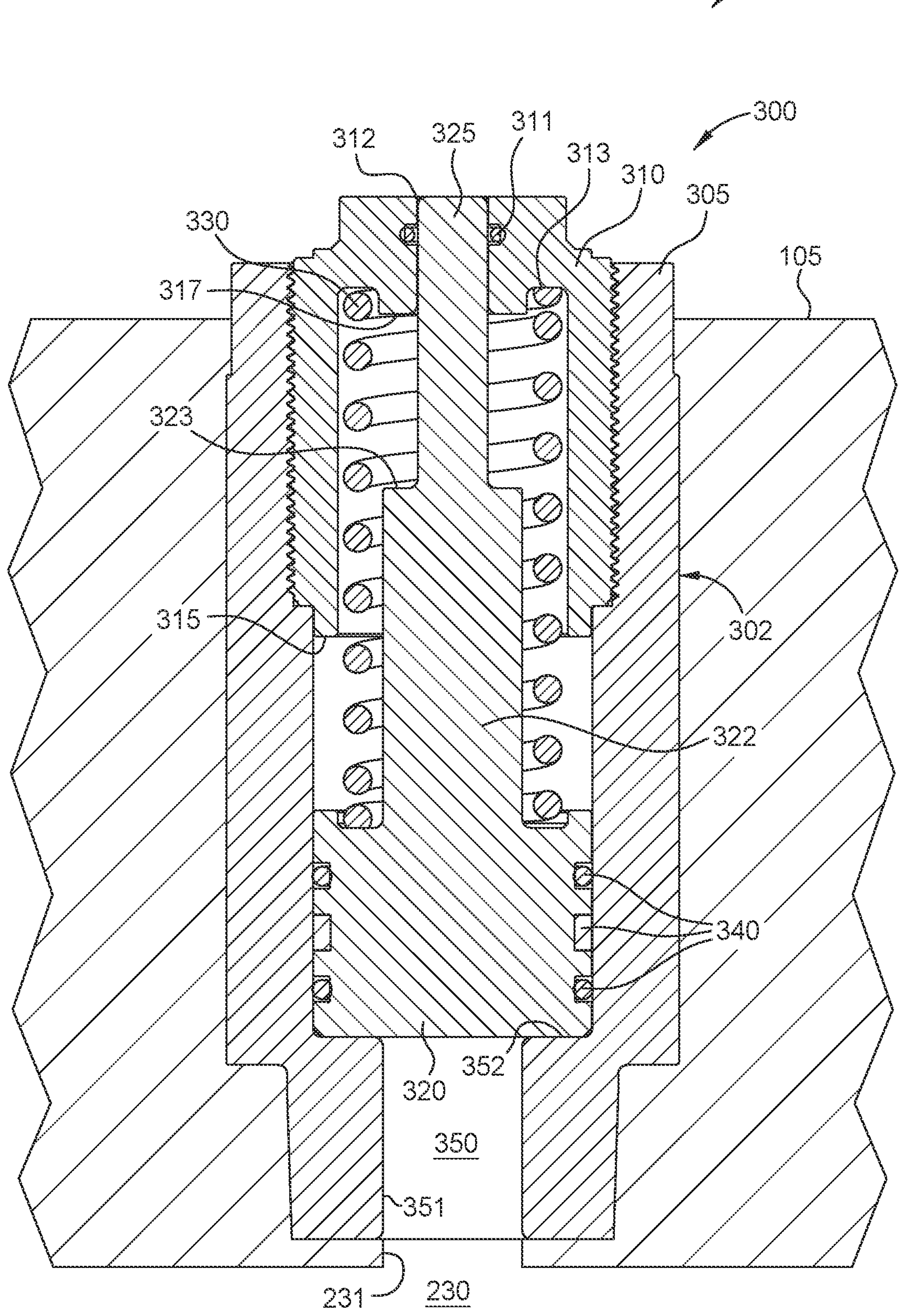
FIG. 5 is a sectional view of the safety device in the first position when coupled to the fluid end, according to one or more embodiments.

FIG. 5 is a sectional view of the safety device 300 in the first position when coupled to the fluid end 100, according to one or more embodiments. The top housing 310 is shown as being threaded into the bottom housing 305 but can be coupled to the bottom housing 305 in other ways. Similarly, the bottom housing 305 can be threaded into the fluid end body 105 but can also be coupled to the fluid end body 105 in other ways.

The safety device further includes a support member 322 and a biasing member 330 disposed within the outer housing 302. The biasing member 330 may be in the form of one or more springs. The upper end of the support member 322 forms the visual indicator 325, which may be marked with a visible marker, such as a color, red for example. The biasing member 330 biases the support member 322 in a direction inward and/or toward the fluid end body 105 such that the visual indicator 325 is retracted into the outer housing 302.

The lower end of the support member 322 forms a piston 320 comprising a seal assembly 340 that sealingly engages the outer housing 302. The seal assembly 340 may comprise one or more seals, such as O-rings, and may also include one or more wear rings disposed between the seals. The seal assembly 340 forms a seal between the outer diameter of the piston 320 and the inner wall of the bottom housing 305, thereby forming a piston chamber 350 below the piston 320 within the bottom housing 305. The lower end of the bottom housing 305 has a flow bore 351 (which may also form a portion of the piston chamber 350) through which fluid can flow into and out of the piston chamber 350. The safety device 300 is coupled to the fluid end body 105 such that fluid from the discharge chamber 230 can flow through the port 231, and through the flow bore 351 into the piston chamber 350.

As shown in FIG. 5, when the safety device 300 is in the first position, the biasing member 330 forces the bottom end of the piston 320 into engagement with an inner shoulder 352 of the bottom housing 305. The inner shoulder 352 acts as a stop, which prevents further movement of the support member 322 in that direction. The biasing member 330 is disposed between the top end of the piston 320 and an inner shoulder 313 of the top housing 310. The visual indicator 325 is in a retracted position. The upper end of the visual indicator 325 is at least partially disposed within a bore 312 formed through the upper end of the top housing 310. A seal, such as an O-ring, may be disposed within a groove formed in the bore 312 and seals against the outer diameter of the visual indicator 325.

Figure 6:
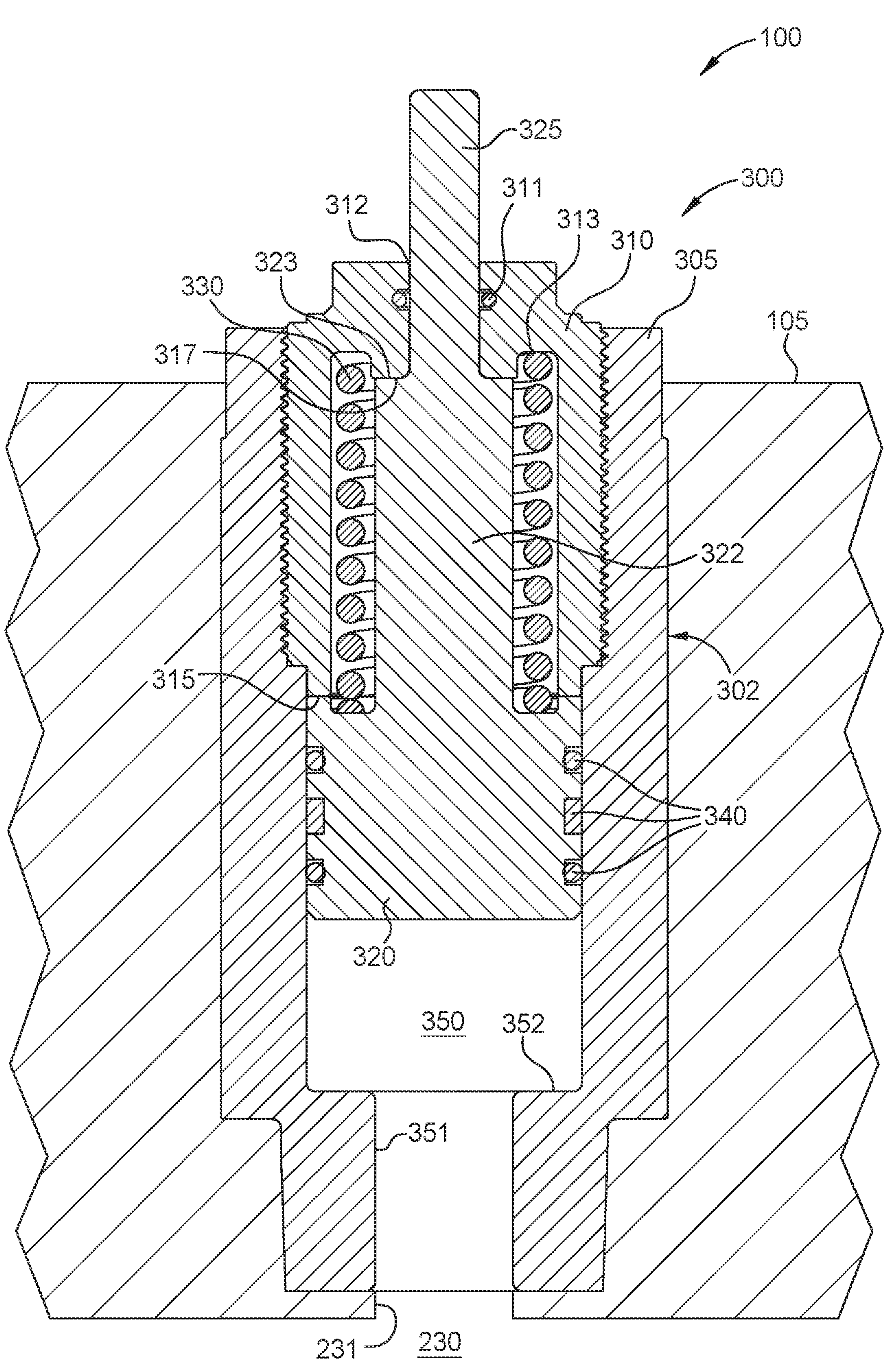
FIG. 6 is a sectional view of the safety device in the second position when coupled to the fluid end, according to one or more embodiments.

FIG. 6 is a sectional view of the safety device 300 in the second position when coupled to the fluid end 100, according to one or more embodiments. Pressurized fluid from the discharge chamber 230 of the fluid end body 105 flows through the port 231, and through the flow bore 351 into the piston chamber 350. When the pressurized fluid is at or above a pressure sufficient to apply a force to the bottom end of the piston 320 that is greater than the bias force of the biasing member 330, then the support member is moved in a direction outward and/or away from the fluid end body 105 such that the visual indicator 325 is extended out of the outer housing 302.

As shown in FIG. 6, when the safety device 300 is in the second position, the biasing member 330 is compressed between the top end of the piston 320 and the inner shoulder 313 of the top housing 310. The pressurized fluid forces the top end of the piston 320 into engagement with the bottom end 315 of the top housing 310. The bottom end 315 of the top housing 310 acts as a stop, which prevents further movement of the support member 322 in that direction. In addition or alternatively, the support member 322 may comprise an outer shoulder 323 that engages another inner shoulder 317 of the top housing 310. The inner shoulder 317 of the top housing 310 similarly acts as a stop, which prevents further movement of the support member 322 in that direction. The visual indicator 325 is in an extended position. At least a portion of the visual indicator 325 extends through the bore 312 and out of the top housing 310.

When the pressurized fluid is removed from the piston chamber 350 or is at a pressure that is less than the bias force of the biasing member 330, then the support member 322 is moved back into the first position such that the visual indicator 325 is retracted back into the outer housing 302. Prior to performing maintenance and/or repair, workers can easily view the position of the safety device 300 to confirm whether it is safe to access the internal components of the fluid end 100.

Although only one safety device 300 is shown coupled to the fluid end 100, any number of safety devices 300 can be coupled to the fluid end 100 and at various locations. One or more safety devices 300 can be coupled to the fluid end 100 such that they are in fluid communication with the discharge chamber 230. In addition or alternatively, one or more safety devices 300 can be coupled to the fluid end 100 such that they are in fluid communication with the suction chamber 225 illustrated in FIGS. 1 and 2.

In one embodiment, a safety method may comprise shutting down the fluid end 100 by stopping fluid flow through the fluid end 100 and draining the pressurized fluid from the fluid end 100. When the fluid end 100 is not operating, the method may comprise viewing the safety device 300 to determine whether there is still pressurized fluid within the fluid end 100 at a pressure above a predetermined pressure. If the safety device 300 is in the first position such that the visual indicator 325 is retracted into the outer housing 302, then it is safe to access the internal components of the fluid end 100. The method may further comprise accessing the internal components of the fluid end 100 by removing the top cover 203, the valve cover 116, and/or any other covers and/or components needed to access the internal components of the fluid end 100. If the safety device 300 is in the second position such that the visual indicator 325 is extended out of the outer housing 302, then it is not safe to access the internal components of the fluid end 100. The method may further comprise draining the pressurized fluid from the fluid end 100 again until the safety device 300 indicates that it is safe to access the internal components of the fluid end 100.

In one embodiment, the safety device 300 may have a maximum working pressure within a range of 5,000 psi to 10,000 psi. In one embodiment, the travel of the support member 322 may be within a range of 1 inch to 2 inches. In one embodiment, the bias force of the biasing member 330 may be set such that the minimum amount of pressure needed to actuate the safety device 300 from the first position (fully retracted) to the second position (fully extended) may be within a range of 50 psi to 100 psi.

Benefits of the present disclosure include a reliable and visible safety mechanism that can prevent worker injury due to pressurized fluid being trapped or otherwise unknowingly disposed within fluid ends.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A fluid end, comprising:

a fluid end body having a suction chamber and a discharge chamber formed within the fluid end body;

a suction valve assembly configured to control fluid flow into the suction chamber;

a discharge valve assembly configured to control fluid flow into the discharge chamber; and a safety device coupled to the fluid end body and in fluid communication with at least one of the suction chamber and the discharge chamber, wherein the safety device comprises an outer housing and a visual indicator, wherein the visual indicator is moveable between a first position where the visual indicator is retracted into the outer housing, and a second position where the visual indicator is extended out of the outer housing, wherein the outer housing comprises a top housing coupled to a bottom housing, wherein a lower end of the bottom housing has an outer diameter smaller than an outer diameter of an upper end of the bottom housing, and wherein the lower end of the bottom housing is recessed within the fluid end body, wherein the safety device further comprises a biasing member disposed within the bottom housing such that the biasing member is at least partially disposed within the fluid end body.

2. The fluid end of claim 1, wherein the safety device further comprises a support member disposed within the outer housing, wherein an upper end of the support member forms the visual indicator.

3. The fluid end of claim 2, wherein the visual indicator is marked with a visible marker comprising a color.

4. The fluid end of claim 2, wherein the biasing member biases the support member in a direction toward the fluid end body such that the visual indicator is retracted into the outer housing.

5. The fluid end of claim 4, wherein a lower end of the support member forms a piston comprising a seal assembly that sealingly engages the outer housing.

6. The fluid end of claim 5, wherein the seal assembly forms a seal between an outer diameter of the piston and an inner wall of the outer housing, thereby forming a piston chamber below the piston within the outer housing.

7. The fluid end of claim 6, wherein when the safety device is in the first position, the biasing member forces a bottom end of the piston into engagement with an inner shoulder of the bottom housing.

8. The fluid end of claim 7, wherein the biasing member is disposed between a top end of the piston and an inner shoulder of the outer top housing.

9. The fluid end of claim 8, wherein the lower end of the bottom housing comprises a flow bore through which fluid can flow into and out of the piston chamber.

10. The fluid end of claim 9, wherein the safety device is coupled to the fluid end body such that fluid from the suction chamber or the discharge chamber can flow through the flow bore into the piston chamber.

11. The fluid end of claim 10, wherein pressurized fluid from the suction chamber or the discharge chamber of the fluid end body flows through the flow bore into the piston chamber, and wherein when the pressurized fluid is at or above a predetermined pressure, the support member is moved in a direction away from the fluid end body such that the visual indicator is extended out of the outer housing and into the second position.

12. The fluid end of claim 11, wherein the visual indicator extends through a bore formed through an upper end of the top housing.

13. The fluid end of claim 12, wherein when the safety device is in the second position, the biasing member is compressed between the top end of the piston and the inner shoulder of the top housing.

14. The fluid end of claim 13, wherein when the safety device is in the second position, the pressurized fluid forces the top end of the piston into engagement with another inner shoulder of the outer housing.

15. The fluid end of claim 13, wherein the support member further comprises an outer shoulder, and wherein when the safety device is in the second position, the pressurized fluid forces the outer shoulder of the support member into engagement with another inner shoulder of the outer housing.

16. The fluid end of claim 1, wherein the upper end of the bottom housing protrudes out of the fluid end body.

17. A safety method, comprising:

shutting down a fluid end by stopping pressurized fluid flow through the fluid end and draining pressurized fluid from the fluid end;

when the fluid end is not operating, viewing a safety device that is coupled to the fluid end to determine whether there is still pressurized fluid within the fluid end at a pressure above a predetermined pressure, wherein the safety device comprises an outer housing and a visual indicator at least partially disposed within the outer housing that is movable between a first position to a second position, wherein the outer housing comprises a top housing coupled to a bottom housing, wherein a lower end of the bottom housing has an outer diameter smaller than an outer diameter of an upper end of the bottom housing, wherein the lower end of the bottom housing is recessed within a body of the fluid end, and wherein the safety device further comprises a biasing member disposed within the bottom housing such that the biasing member is at least partially disposed within the body of the fluid end;

if the visual indicator is viewed as being in the first position such that the visual indicator is retracted into the outer housing, then further comprising accessing internal components of the fluid end by removing a cover of the fluid end; and if the visual indicator is viewed as being in the second position such that the visual indicator is extended out of the outer housing, then further comprising draining the pressurized fluid again from the fluid end until the safety device is viewed as being in the first position.

18. The safety method of claim 17, wherein the outer housing of the safety device comprises a piston chamber that is in fluid communication with a fluid chamber formed within a fluid end body of the fluid end.

19. The safety method of claim 18, wherein the safety device further comprises a support member disposed within the outer housing, wherein an upper end of the support member forms the visual indicator.

20. The safety method of claim 17, wherein the biasing member biases the support member in a direction toward the fluid end body such that the visual indicator is retracted into the outer housing.

21. The safety method of claim 17, wherein a lower end of the support member forms a piston comprising a seal assembly that sealingly engages the outer housing, wherein the seal assembly forms a seal between an outer diameter of the piston and an inner wall of the outer housing, thereby forming the piston chamber below the piston within the outer housing.

22. The safety method of claim 17, wherein the upper end of the bottom housing protrudes out of the body of the fluid end.

* * * * *